United States Patent [19]

Ohmori et al.

[11] Patent Number: 5,065,264

[45] Date of Patent: Nov. 12, 1991

[54] CAPSTAN ARRANGEMENT FOR A MAGNETIC RECORDING/REPRODUCTION APPARATUS

[75] Inventors: Motonori Ohmori; Ikuo Nishida; Koji Iyota; Hidekazu Takeda; Masao Iwakura; Tetsuo Itou, all of Katsuta, Japan

[73] Assignees: Hitachi, Ltd.; Hitachi Video Engineering, Inc., both of Japan

[21] Appl. No.: 473,426

[22] Filed: Feb. 1, 1990

[30] Foreign Application Priority Data

Feb. 10, 1989 [JP]  Japan .................................. 1-029909

[51] Int. Cl.$^5$ .............................................. G11B 15/66
[52] U.S. Cl. ........................................ 360/85; 360/95; 360/96.5
[58] Field of Search ................... 360/85, 95, 93, 96.5, 360/96.3

[56] References Cited

U.S. PATENT DOCUMENTS

| 4,748,521 | 5/1988 | Osawa et al. ............... 360/85 X |
| 4,814,910 | 3/1989 | Kaku et al. ..................... 360/95 |
| 4,862,300 | 8/1989 | Kaku et al. ................. 360/85 X |
| 4,956,732 | 9/1990 | Moriyama .................... 360/85 |
| 4,959,739 | 9/1990 | Tsutsumi et al. ............ 360/85 |

FOREIGN PATENT DOCUMENTS 61-273769 12/1986 Japan ...................... 360/85

Primary Examiner—Aristotelis Psitos
Assistant Examiner—Alfonso Garcia
Attorney, Agent, or Firm—Antonelli, Terry, Stout & Kraus

[57] ABSTRACT

A magnetic recording/reproducing apparatus has a chassis, a rotary cylinder mounted on the chassis, and at least one guide base movably disposed around the rotary cylinder. The guide base is provided with a guide member for drawing out a magnetic tape from a tape cassette. The guide member draws out the magnetic tape from the tape cassette, as the guide base is being moved, and winds the magnetic tape around the rotary cylinder so that a predetermined tape passage is defined. The magnetic recording/reproducing apparatus further has a capstan mechanism for driving the magnetic tape to run the same. The capstan mechanism is arranged on the same side of the chassis on which the rotary cylinder is disposed, and has a capstan downwards extending toward the chassis to come into direct contact with the magnetic tape.

3 Claims, 4 Drawing Sheets

CAPSTAN ARRANGEMENT FOR A MAGNETIC RECORDING/REPRODUCTION APPARATUS

BACKGROUND OF THE INVENTION

The present invention relates to a magnetic recording/reproducing apparatus, such as a cassette video tape recorder (VTR), having a tape loading mechanism, and, more particularly, to an improvement in a capstan thereof.

A VTR is designed to use a magnetic tape, accommodated in a tape cassette for the purpose of saving labor required for loading the magnetic tape, and a tape loading mechanism is provided therein. Upon the tape cassette being inserted into the apparatus, the tape loading mechanism automatically draws out the magnetic tape from the tape cassette so as to set the tape to a rotary cylinder. As a result, a predetermined tape passage is formed.

The tape loading mechanism of the type described above is disclosed in, for example, Japanese Patent Laid-Open No. 61-273769. wherein the tape loading mechanism comprises a guide base arranged so as to be movable around the rotary cylinder and guide members such as guide pins and guide rollers which are disposed on the guide base. In the loading operation, when the tape cassette is inserted into the tape loading mechanism, the guide base moves accompanied by the guide members so as to catch the magnetic tape accommodated in the tape cassette. As a result, the magnetic tape is withdrawn from the tape cassette. Then, the guide members cause the magnetic tape to be spirally wound around the rotary cylinder at a predetermined angle. As a result, the predetermined passage through which the magnetic tape is able to pass can be defined. Accompanying with the loading operation, a pinch roller is also moved so as to hold the magnetic tape in cooperation with the capstan in the state in which the magnetic tape has been set and thereby the predetermined tape passage has been formed. Thus, the magnetic tape is run through the tape passage by the capstan rotated by a motor.

The VTR of the type described above is designed in such a manner that the capstan mechanism comprising a capstan motor is disposed on a chassis on a side opposite to the side to which the rotary cylinder is provided, the opposite side on which the capstan mechanism is disposed being called "a rear side of a chassis" hereinafter. The capstan is arranged so as to penetrate a through hole formed in the chassis so that the capstan projects over the surface of the chassis.

Recently, VTRs have been reduced in size and thickness, with the reduction in size causing the guide members and the capstan, for forming the tape passage, to be disposed adjacent to the rotary cylinder.

However, the degree of the reduction in thickness is limited in dependence upon the height of the rotary cylinder from the surface of the chassis and the arrangement of the capstan motor. Because the conventional capstan is disposed so as to project in an upward direction wherein the rotary shaft of the motor serves as the capstan, the capstan motor is inevitably below the capstan, that is adjacent to the chassis.

SUMMARY OF THE INVENTION

An object of the present invention is to provide a magnetic recording/reproducing apparatus having a reduced size and thickness.

Another object of the present invention is to provide a magnetic recording/reproducing apparatus having a reduced size and the thickness without deterioration in the structural strength thereof.

In accordance with advantageous features of the present invention, to achieve the above-described objects, the capstan mechanism is disposed on the same side of the chassis in which the rotary cylinder is disposed.

According to the present invention, a magnetic recording/reproducing apparatus comprises a chassis, a rotary cylinder mounted on the chassis, at least one guide base movably disposed around the rotary cylinder, and guide means for withdrawing a magnetic tape from a tape cassette. The guide means are mounted on the guide base for movement with the same to withdraw or pull out the magnetic tape from the tape cassette as the guide base is being moved, and to wind the magnetic tape around the rotary cylinder so as to define a predetermined tape passage through which the magnetic tape runs. A capstan mechanism drives the magnetic tape with, the capstan mechanism being disposed on the same side of the chassis on which the rotary cylinder is disposed and having a capstan extending toward the chassis to come into direct contact with the magnetic tape.

By virtue of the above-described construction of the present invention, as a result of the disposition of the capstan mechanism on the same side of the chassis on which the rotary cylinder is disposed, the structure on the rear side of the chassis can be reduced. Furthermore, since the capstan projects, for example, in a downward direction from the capstan mechanism toward the chassis, a space, in which the guide base can be moved, can be formed between the capstan and the chassis. Therefore, the capstan mechanism can be disposed adjacent to the rotary cylinder without disturbing the movement of the guide base if the height of the capstan mechanism is properly determined. As a result, the space required to form the tape passage can be reduced. Furthermore, since it is not necessary for a hole through which the capstan passes to be formed, the chassis is capable of having a sufficient mechanical strength.

BRIEF DESCRIPTION OF THE DRAWINGS

The above and other objects, features and advantages of the invention will appear more fully from the following description which will be made later with reference to the accompanying drawings in which.

DESCRIPTION OF THE PREFERRED EMBODIMENTS

As described above, in the conventional magnetic recording/reproducing apparatus, the capstan mechanism comprising the capstan motor is mounted on the rear side of the chassis. Thus, the apparatus has a certain limitation in the reduction of the size thereof. Therefore, the thickness of a VTR can be reduced by disposing the capstan motor or the like on the same side of the chassis on which the rotary cylinder is disposed. In this case, however, even if the thickness of the capstan motor is reduced as much as possible, the capstan motor must be disposed away from the rotary cylinder so as not to disturb the movement of the guide base since the capstan motor and the passage for the guide base overlap each other. As a result, since the capstan must be disposed largely away from the rotary cylinder, the size of tape passage is inevitably increased. Therefore, the size of the VTR cannot be reduced.

It might therefore be thought of to employ a structure in which a hole is formed in the chassis so as to accommodate the capstan motor therein for the purpose of reducing the degree of the projection of the same over the chassis. That is, the projection of the capstan motor over the surface of the chassis can be suppressed to an extent of not disturbing the movement of the other members such as the guide base by accommodating the capstan motor within the hole formed in the chassis. Furthermore, since the projection over the rear side of the chassis can be also reduced, the thickness of the VTR can be reduced. In addition, the capstan can be disposed close to the rotary cylinder so as to reduce the size of the VTR by forming the hole closely adjacent to the rotary cylinder.

However, according to the above-described structure, another hole of a large size for mounting the capstan motor is formed adjacent to the large hole for mounting the rotary cylinder formed in the chassis. Therefore, the portion of the chassis in which the hole is formed deteriorates in mechanical strength, causing the chassis to suffer from deflection when the rotary cylinder is mounted. Moreover, a problem arises in that the accuracy in mounting the rotary cylinder deteriorates.

It is desirable that the size and the thickness of the magnetic recording/reproducing apparatus be reduced, by overcoming the above-described problem, without deterioration in its performance. Therefore, the arrangement of the capstan motor on the same side of the chassis on which the rotary cylinder is disposed was determined to be a solution for overcoming above-described problem, with the capstan mechanism comprising the capstan motor being disposed above the chassis.

Figure 1:
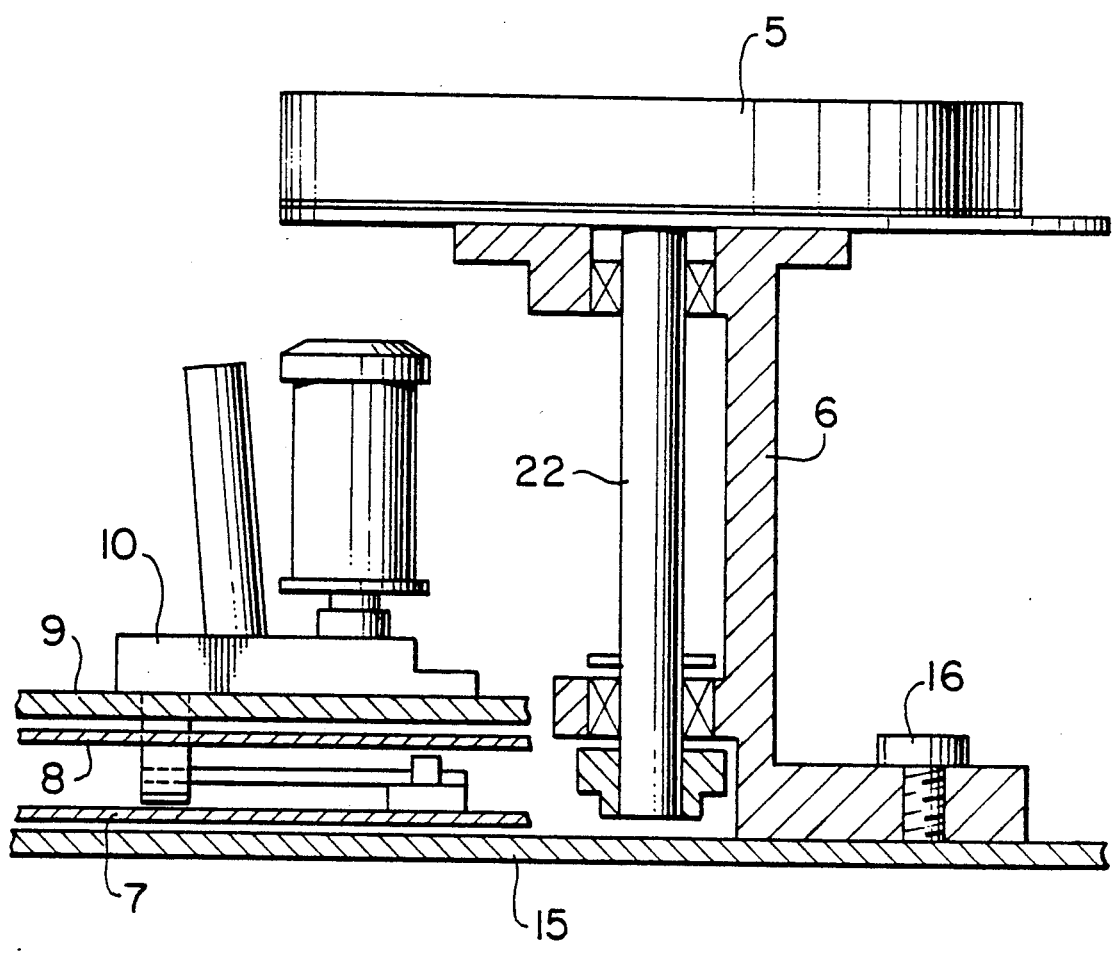
FIG. 1 is a side elevational view which illustrates an essential portion of the magnetic recording/reproducing apparatus according to an embodiment the present invention, where a state in which a capstan motor is mounted onto a chassis is shown.
Figure 2:
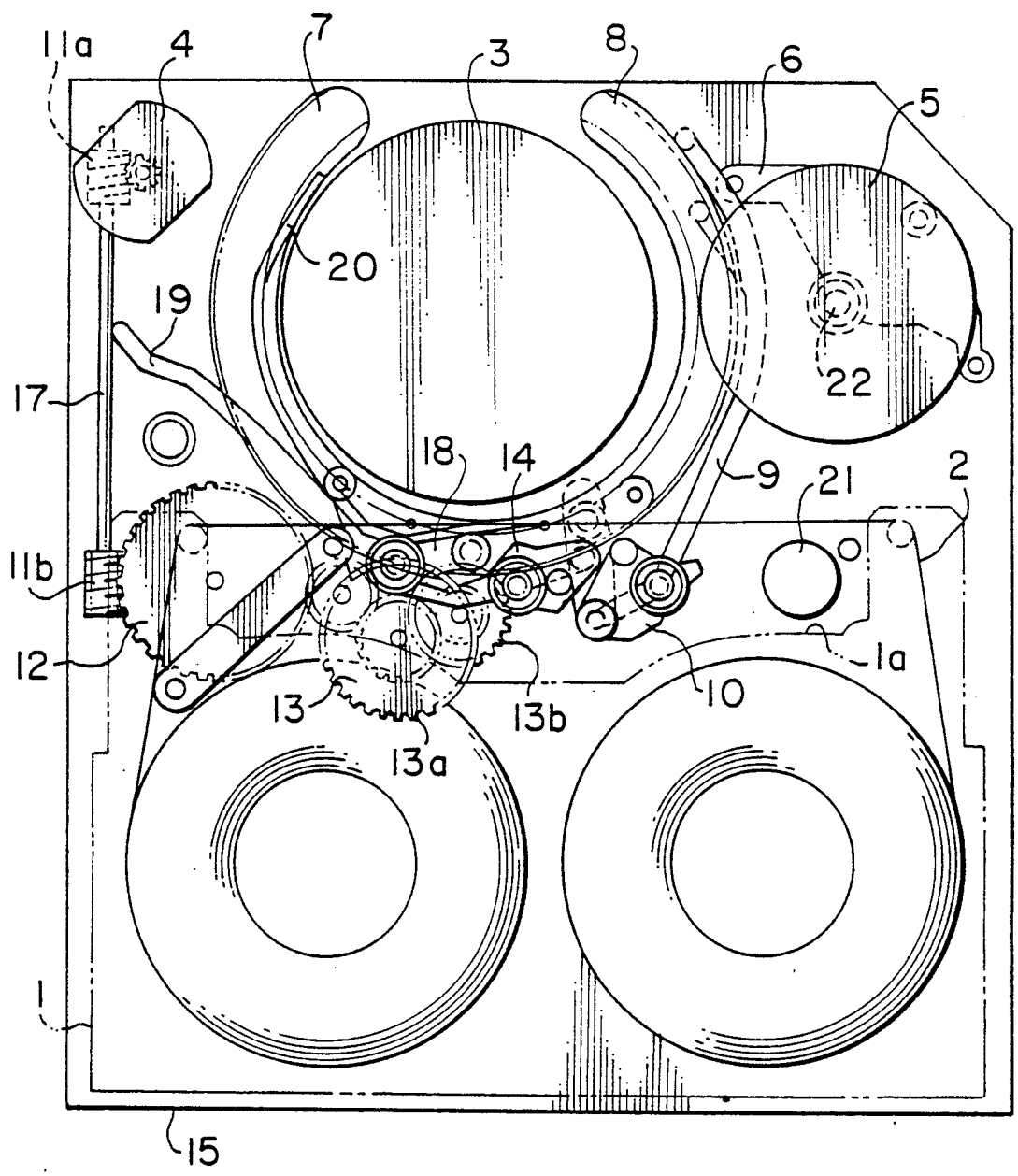
FIG. 2 is a plan view which illustrates the overall structure of the embodiment shown in FIG. 1 in its unloading state.
Figure 3:
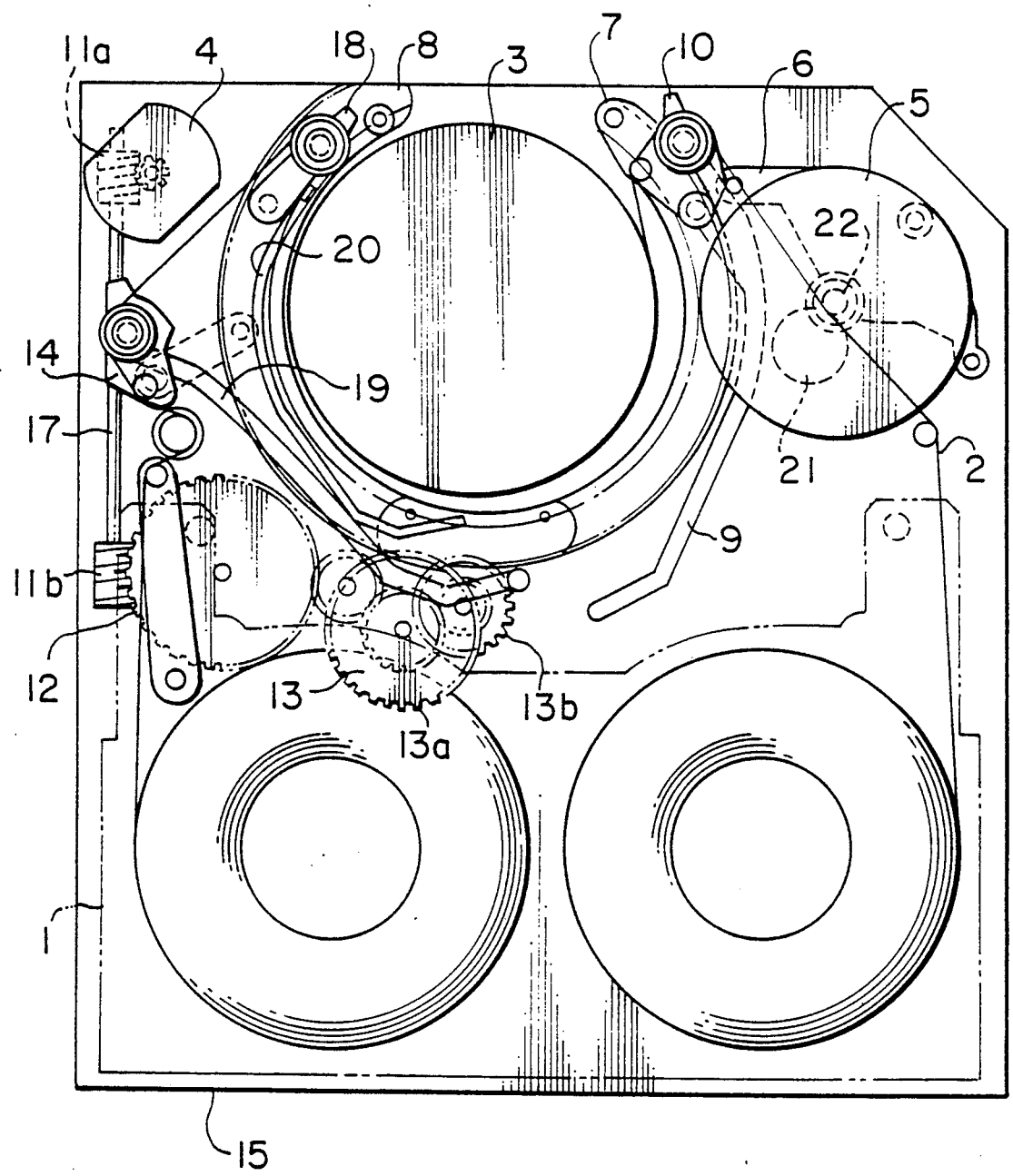
FIG. 3 is a plan view which illustrates the overall structure show in FIG. 2 in its loading state.

Referring now to the drawings wherein like reference numerals are used throughout the various views to designate like parts and, more particularly, to FIGS. 1-3, according to these figures, a magnetic recording-/reproducing apparatus in accordance with the present invention is adapted to accommodate a tape cassette 1, with the tape cassette 1 having an opening through which a magnetic tape 2 may be withdrawn. A rotary cylinder 3 has mounted thereon a recording head and reproducing head, with a loading motor 4 and capstan motor 5 being provided. The magnetic recording/reproducing apparatus also includes a holder 6, loading rings 7, 8, guide plates 9, 19, guide bases 10, 14, 18, worm gears 11a, 11b, a cam gear 12, a reduction gear block 13, reduction gears 13a, 13b, a chassis 15, a setting screw 16, a shaft 17, a guide rail 20, a pinch roller 21 and a capstan 22.

Referring to FIG. 2, the rotary cylinder 3 is rotatably mounted on the chassis 15 of the apparatus in such a manner that the rotary cylinder 3 is inclined at a predetermined angle in a predetermined direction. Two semicircular or semilunar loading rings 7 and 8 are disposed around the rotary cylinder 3. These rings 7 and 8 are arranged to be guided by grooves or the like formed in the chassis 15 and be movable along circular loci around the rotary cylinder 3. The guide bases 14 and 18 are pivotably coupled with the loading ring 8 by pins or the like. Guide pins and guide rollers for feeding the tape are mounted on the guide bases 14 and 18. Similarly, a guide base 10, on which a guide pin and a guide roller for winding up the tape are mounted, is pivotably coupled to the loading ring 7.

The loading motor 4 is mounted on the chassis 15, and a gear secured to the rotary shaft of the loading motor 4 engages with the worm gear 11a. The worm gear 11a is press-fitted onto an end of the elongated shaft 17, while the worm gear 11b is press-fitted onto the other end thereof. The worm gear 11b is engaged with the cam gear 12, and the cam gear 12 is coupled to the reduction gear block 13. The gear 13a of the reduction gear block 13 is engaged with a gear provided on the loading ring 8, while the gear 13b, engaging with the gear 13a, is engaged with a gear provided on the loading ring 7. The rotating force generated by the loading motor 4 is transmitted to the loading rings 7 and 8 via the above-described gear mechanism, so that the loading rings 7 and 8 move in opposite directions each other around the rotary cylinder 3.

In an unloading state in which the magnetic recording/reproducing apparatus has been loaded with the tape cassette 1, the guide members such as the guide pins and the guide rollers on the guide bases 10, 14 and 18 are positioned inside the magnetic tape 2 in the cassette 1. When the loading motor 4 starts operating in the above-described unloading state, the loading ring 8 is moved clockwise around the rotary cylinder 3 by the driving of the loading motor 4, while the loading ring 7 moves in the opposite direction. The guide base 18 is pulled by the thus moved loading ring 8 to move along the guide rail 20, while the guide base 14 is moved along the guide groove formed in the guide plate 19. Furthermore, the loading ring 7 pulls the guide base 10 to move the same along the guide groove formed in the guide plate 9. As the guide bases 10, 14 and 18 are moving, the guide members mounted thereon catch the magnetic tape 2 in the tape cassette 1 so as to draw out it from the tape cassette 1. Accompanying with this, the pinch roller 21 is moved in the direction toward the capstan 22 by a moving means (not shown).

When the guide bases 10, 14 and 18 reach their predetermined positions, the loading motor 4 is stopped and the loading operation is completed, so that a loading state shown in FIG. 3 is realized. In this state, a predetermined tape passage has been defined by the guide members mounted on the guide bases 10 and 18, and the magnetic tape 2 has been spirally wound around the rotary cylinder 3 at a predetermined angle. The magnetic tape 2 is held by the pinch roller 21 and the capstan 22 so as to be run owing to the rotation of the capstan 22 driven by the capstan motor 5.

In the above-described structure, the capstan mechanism including the capstan motor 5 is arranged on the same side of the chassis 15 on which the rotary cylinder 3 is disposed, and secured to the chassis 15 through the holder 6. That is, the holder 6 formed by a molding or the like is secured to the chassis 15 with the setting screw 16 and the capstan motor 5 is secured to the top end of the holder 6, as shown in FIG. 1. The capstan motor 5 is positioned to face downwards and the shaft 22 of which projects toward the chassis 15. In this embodiment, the shaft 22 of the capstan motor 5 serves as the capstan to be brought into directly contact with the magnetic tape 2. The capstan is rotatably supported by bearings provided on the holder 6, and extends perpendicular to the chassis 15.

The holder 6 is designed to have a height with which the capstan motor 6 mounted thereon is positioned higher than the guide member on the guide base 10. The position at which the holder 6 is secured to the chassis 15 is set to be close to the rotary cylinder 3 to such an extent that the holder 6 does not come into contact with the rotary cylinder 4, the guide base 10 which moves along the guide groove formed in the guide plate 9, and guide members mounted on the guide base 10. With this arrangement, as apparent from FIGS. 2 and 3, the guide base 10 can pass below the capstan motor 5 in the course of its movement. Therefore, even with the capstan motor 5 disposed close to the rotary cylinder 3, the capstan motor does not disturb the loading operation.

As described above, according to this embodiment, since the capstan motor 5 is secured to the chassis on the same side on which the rotary cylinder 3 is disposed, the thickness of the apparatus can be reduced as compared with the conventional apparatus in which the capstan motor is disposed on the rear side of the chassis. Furthermore, since the capstan motor 5 can be disposed close to the rotary cylinder 3, the size of the apparatus also can be reduced. Furthermore, since the necessity of forming an extra hole in the chassis, as described above, can be avoided, the mechanical strength of the chassis 15 can be ensured at the position adjacent to the rotary cylinder 3.

Figure 4:
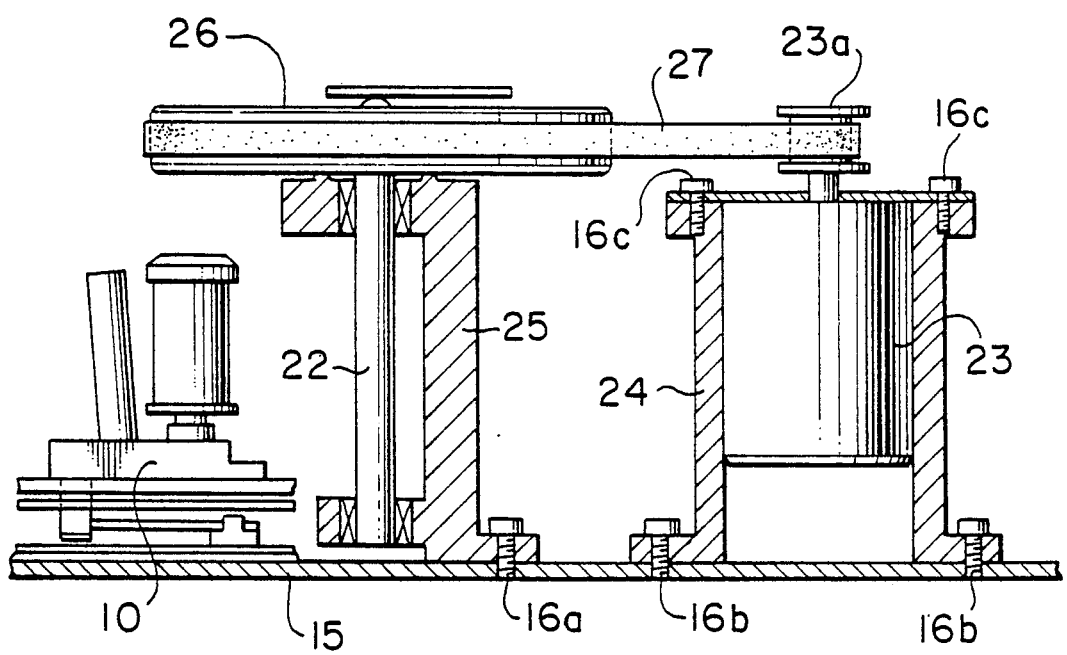
FIG. 4 is a side elevational view which illustrates an essential portion of the magnetic recording/reproducing apparatus according to another embodiment of the present invention.

In accordance with the embodiment of FIG. 4, a magnetic recording/reproducing apparatus is provided which includes a capstan mechanism comprising a flywheel and a capstan motor for rotating the flywheel, with the apparatus also including setting screws 16a, 16b, 16c, a capstan motor 23, a pulley 23a, holders 24, 25, a flywheel 26, and a belt 27.

As shown in FIG. 4, two holders 24 and 25 are secured with the setting screws 16a and 16b on the chassis 15 on the same side thereof on which the rotary cylinder (omitted from the illustration) is disposed, to be arranged adjacent with to each other. The capstan 22 is rotatably supported by bearings provided on the holder 25. The top end of the capstan 22 is press-fit into the flywheel 26. The capstan motor 23 is secured to the holder 24 with the setting screw 16c, and has its rotary shaft press-fitted into the pulley 23a. The belt 27 is wound around the flywheel 26 and the pulley 23a so that the rotation of the motor 23 is transmitted to the capstan 22 through the pulley 23a, the belt 27 and the flywheel 26. Thus, the capstan 22 is stably rotated by the driving of the motor 23 under the action of the flywheel 26.

Similarly to the above-described embodiment, the height of the holder 25 is determined so as to position the flywheel 26 higher than the guide member on the guide base 10. Also, similarly to the holder 6 shown in FIGS. 2 and 3, the position at which the holder 25 is secured to the chassis 15 is set to be close to the rotary cylinder to such an extent that the flywheel 26 does not come into contact with the rotary cylinder and that the guide base 10 being moved and the guide member mounted on the guide base 10 do not come into contact with the holder 25. With this arrangement, the guide base 10 can move below the flywheel 26 so that it does not disturb the loading operation. Incidentally, the holder 24 is positioned close to the holder 25 so as to reduce the space required for positioning a driving mechanism for the capstan 22.

According to the embodiment of FIG. 4, the size and the thickness of the apparatus can be reduced, and the mechanical strength of the chassis in the portion adjacent to the rotary cylinder can be ensured, similarly to the previously described embodiment.

As can be clearly seen from the description above, according to the present invention, the capstan mechanism can be disposed close to the rotary cylinder on the same side of the chassis on which the rotary cylinder is disposed without disturbing the loading operation. As a result, the size and the thickness of the apparatus can be reduced, and the necessity of an extra processing of the chassis can be avoided to ensure a sufficient strength of the chassis.

It is to be understood that, although the present invention has been described on the embodiments, the invention is not limited solely to these specific forms of the embodiments and various modifications can be made thereto or the invention can take other forms without departing from the scope of the accompanying claims.

What is claimed is:

1. A magnetic record/reproducing apparatus comprising:
    a chassis;
    a rotary cylinder mounted on a side of said chassis;
    at least one guide base movably disposed around said rotary cylinder;
    guide means for withdrawing a magnetic tape from a tape cassette, said guide means being mounted on said guide base for movement with the same to withdraw said magnetic tape from said tape cassette as said guide base is being moved, and to wind said magnetic tape around said rotary cylinder so as to define a predetermined passage through which said magnetic tape runs; and
    a capstan mechanism of driving said magnetic tape to move the same, said capstan mechanism being completely disposed on the same side of said chassis on which said rotary cylinder is disposed and having a capstan extending toward said chassis to come into direct contact with said magnetic tape, and wherein said capstan mechanism comprises a flywheel which has a rotary shaft serving as said capstan and capstan motor means for rotating said flywheel.

2. A magnetic recording/reproducing apparatus comprising:
    a chassis;
    a rotary cylinder mounted on said chassis;
    at least one guide base movably disposed around said rotary cylinder;

guide means for drawing out a magnetic tape from a tape cassette, said guide means being mounted on said guide base for movement with said guide base to draw out said magnetic tape from said tape cassette as said guide base is being moved, and to wind said magnetic tape around said rotary cylinder so to define a predetermined passage through which said magnetic tape runs; and a capstan mechanism for driving said magnetic tape to move the same, said capstan mechanism being disposed on a side of said chassis on which said rotary cylinder is disposed and having a capstan extending toward said chassis to come into direct contact with said magnetic tape, said capstan mechanism comprises a capstan motor which has a rotary shaft serving as said capstan, said capstan motor is mounted on a holder secured to said chassis and disposed close to said rotary cylinder, and wherein a height of said holder is such that said capstan motor is positioned higher than said guide means on said guide base to allow said guide means to move below said capstan motor.

3. A magnetic recording/reproducing apparatus comprising:

a chassis;

a rotary cylinder mounted on said chassis;

at least one guide base movably disposed around said rotary cylinder;

guide means for drawing out a magnetic tape from a tape cassette, said guide means being mounted on said guide base for movement with said guide base to draw out said magnetic tape from said tape cassette as said guide base is being moved, and to wind said magnetic tape around said rotary cylinder so to define a predetermined passage through which said magnetic tape runs; and a capstan mechanism for driving said magnetic tape to move the same, said capstan mechanism being disposed on a side of said chassis on which said rotary cylinder is disposed and having a capstan extending toward said chassis to come into direct contact with said magnetic tape, said capstan mechanism comprise a flywheel which has a rotary shaft serving as said capstan and capstan motor means for rotating said flywheel, wherein said flywheel and said capstan motor means are respectively mounted on holders secured to said chassis, and said holder of said flywheel is formed such that said flywheel is position higher than said guide means to allow said guide means to move below said flywheel, said flywheel being disposed close to said rotary cylinder.

* * * * *